April 8, 1924.  
J. NORTHROP  
SHIPPER MECHANISM FOR LOOMS  
Filed Jan. 29, 1923  
1,489,611  
5 Sheets-Sheet 1

Witness:  
Alfred H. McGlinchey.

Inventor:  
Jonas N. throp  
By his attorneys  
Van Everen Fish Hildreth & Cary

April 8, 1924.

J. NORTHROP

SHIPPER MECHANISM FOR LOOMS

Filed Jan. 29, 1923

1,489,611

5 Sheets-Sheet 2

Witness:
Alfred H. McGlinchy.

Inventor:
Jonas Northrop
by his attorneys
Van Everen Fish Hildreth & Kay

April 8, 1924.
J. NORTHROP
SHIPPER MECHANISM FOR LOOMS
Filed Jan. 29, 1923
1,489,611
5 Sheets-Sheet 3
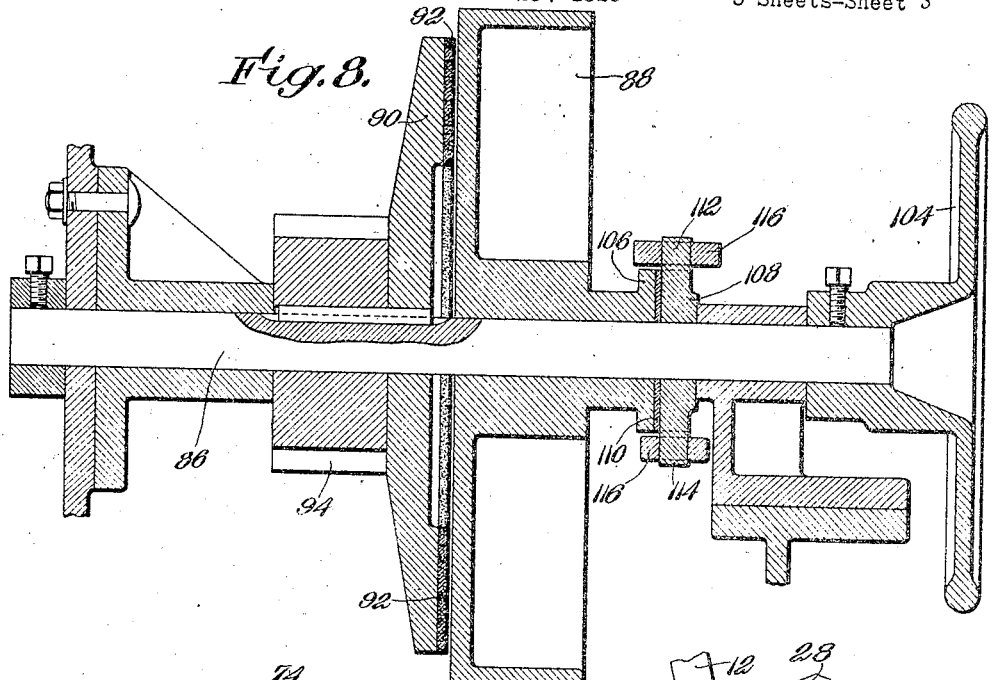
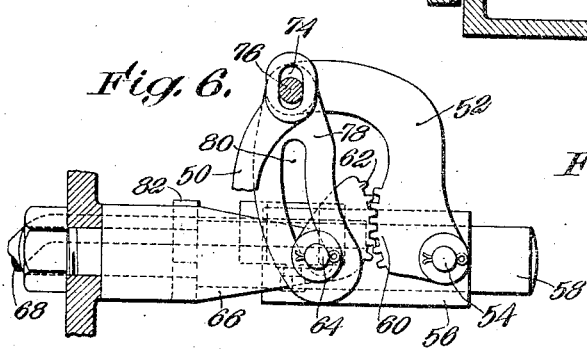
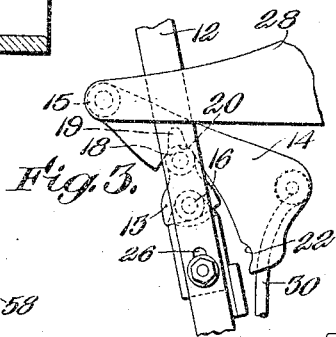
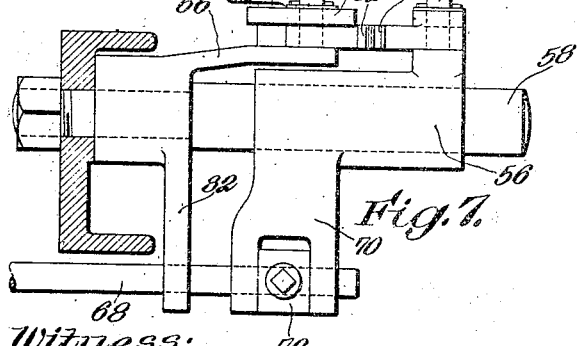
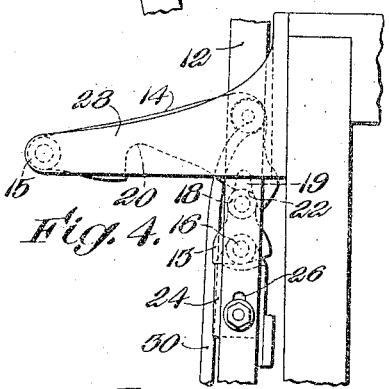

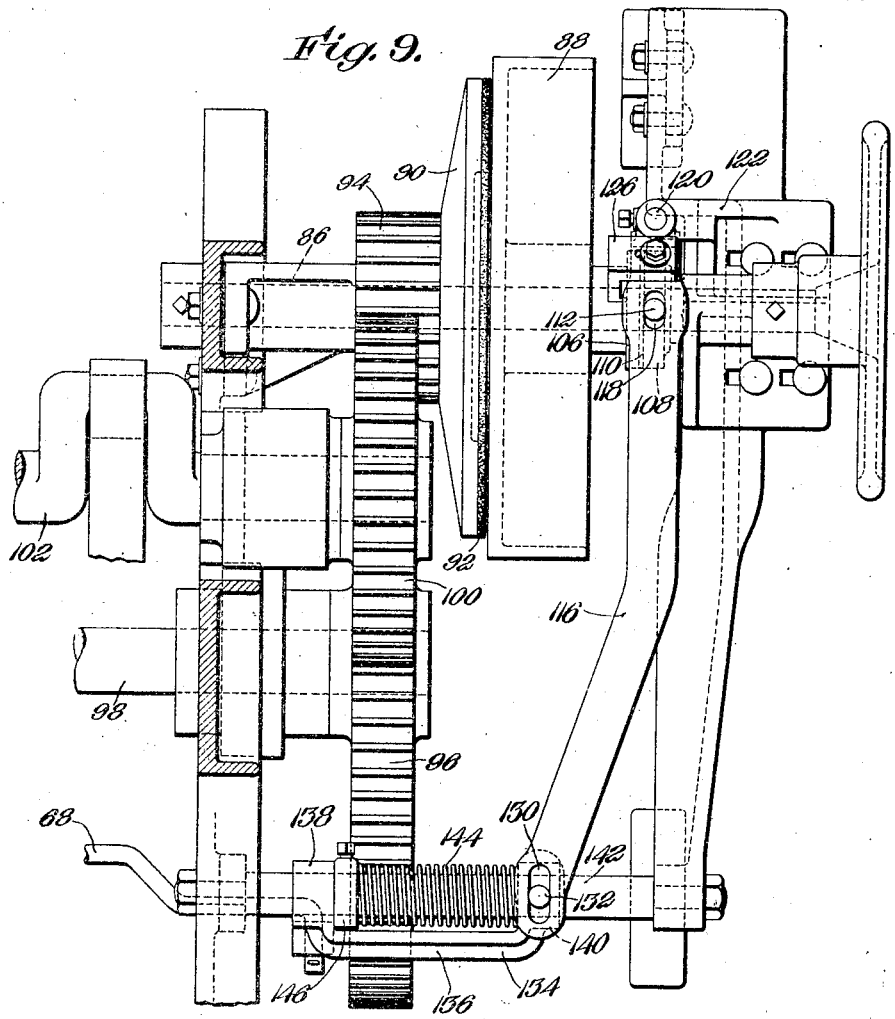
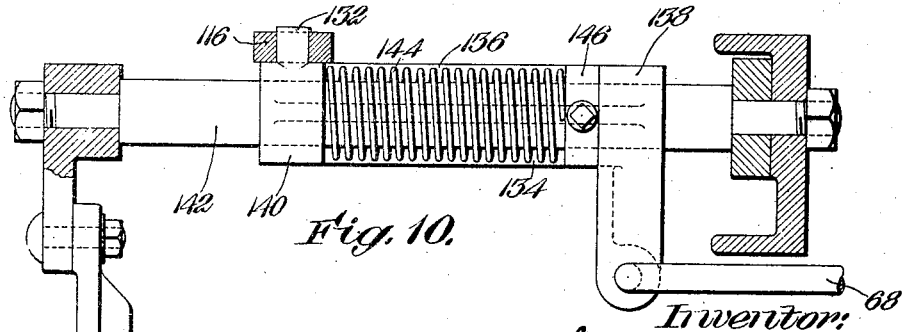

Patented Apr. 8, 1924.

1,489,611

UNITED STATES PATENT OFFICE.

JONAS NORTHROP, OF HOPEDALE, MASSACHUSETTS, ASSIGNOR TO HOPEDALE MANUFACTURING COMPANY, OF MILFORD, MASSACHUSETTS, A CORPORATION OF MASSACHUSETTS.

SHIPPER MECHANISM FOR LOOMS.

Application filed January 29, 1923. Serial No. 615,515.

*To all whom it may concern:*

Be it known that I, JONAS NORTHROP, a citizen of the United States, residing at Hopedale, in the county of Worcester and State of Massachusetts, have invented certain new and useful Improvements in Shipper Mechanism for Looms; and I do hereby declare the following to be a full, clear, and exact description of the invention, such as will enable others skilled in the art to which it appertains to make and use the same.

The present invention relates to an improvement in looms.

The object of this invention is to reorganize and improve the construction of looms and more particularly the shipper mechanisms of looms and to this end the invention consists of the improvement hereinafter described and particularly defined in the claims.

Figure 1:
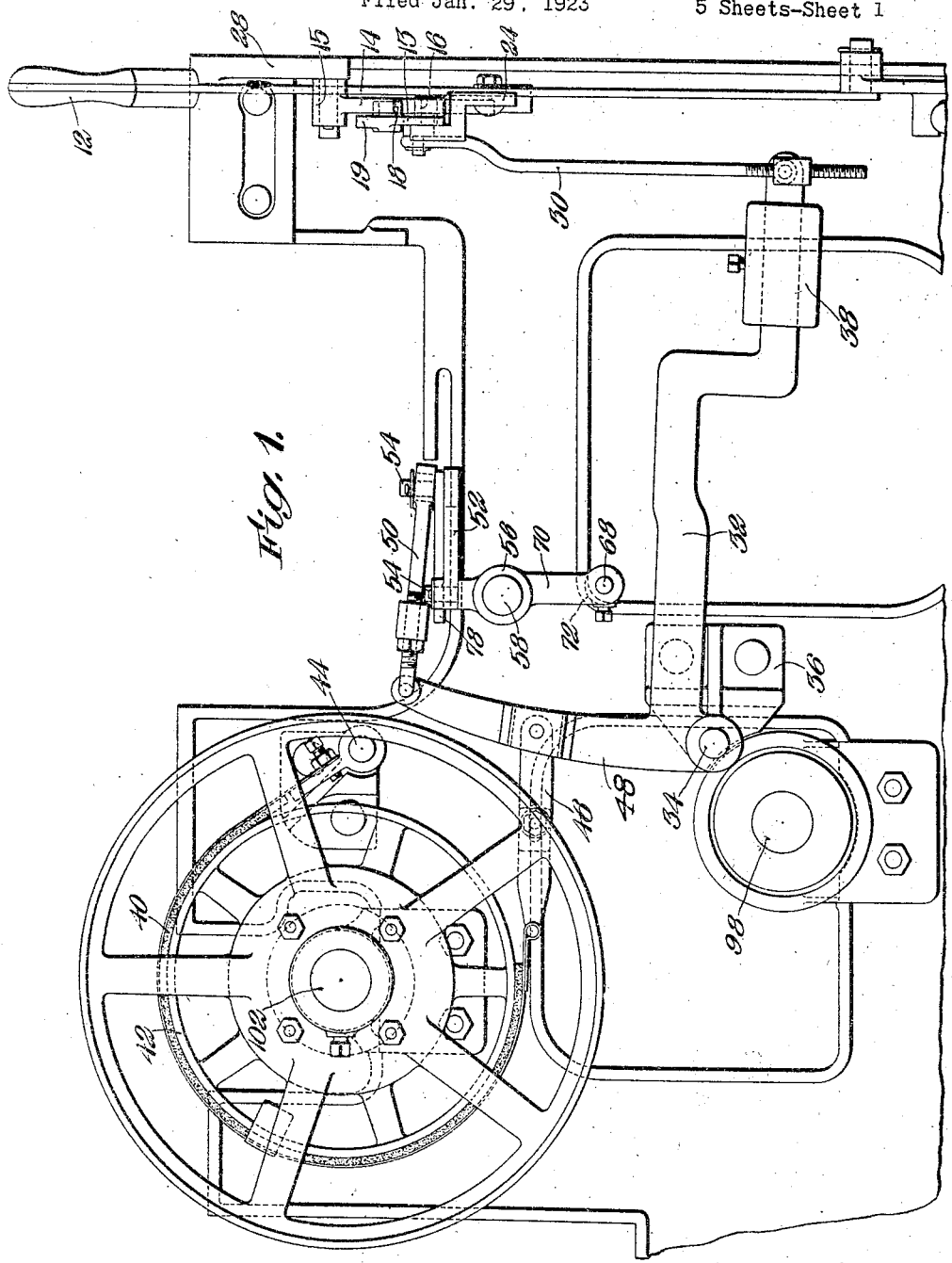
Figures 2, 5:
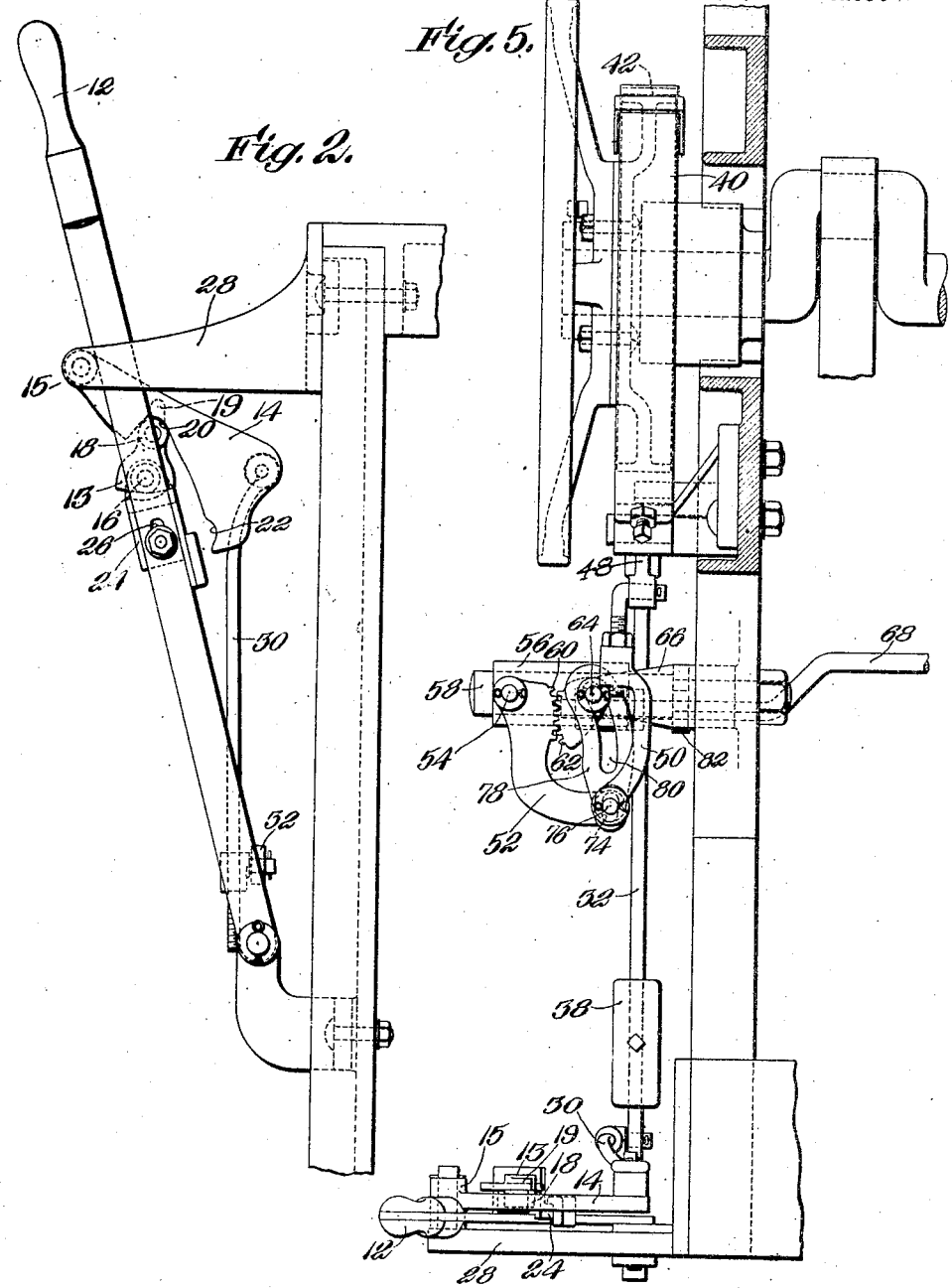
Figure 11:
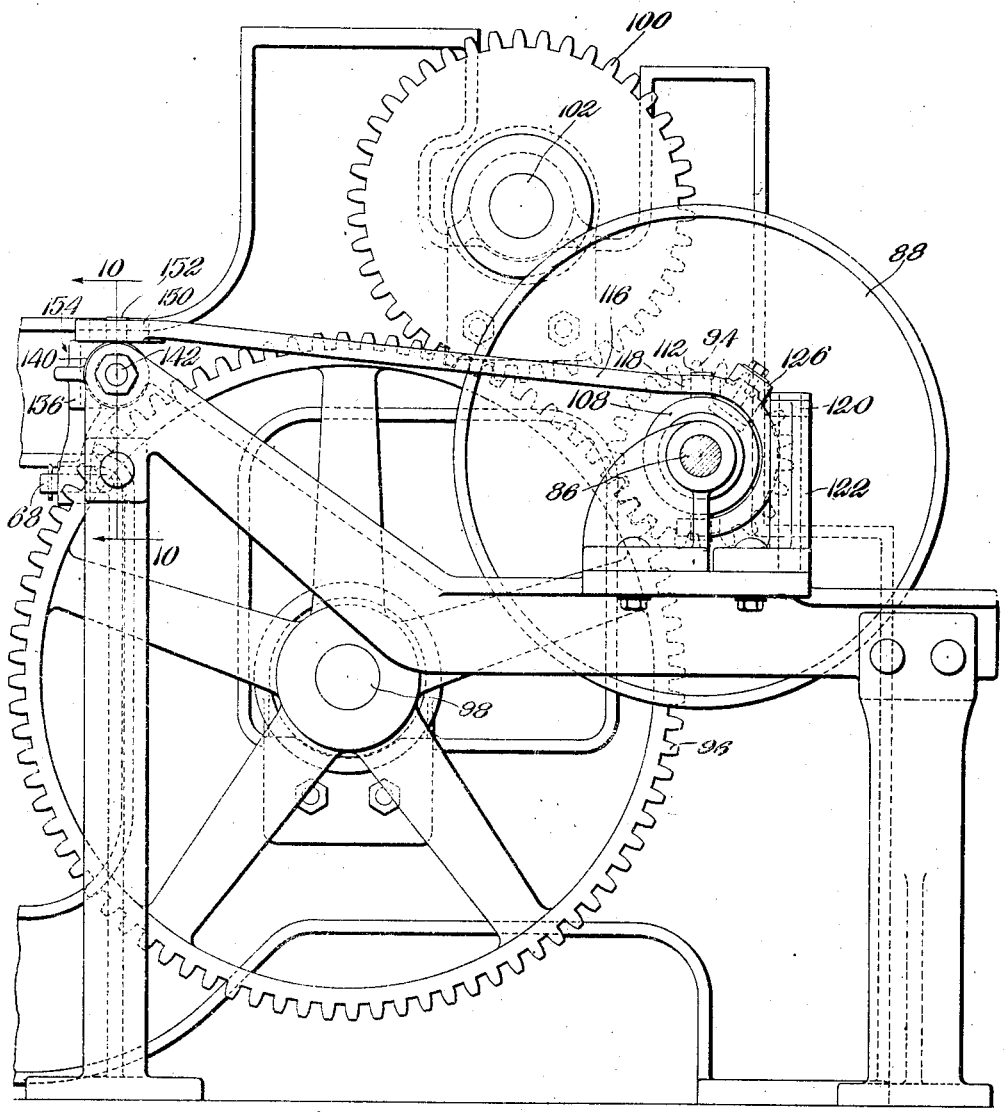

In the accompanying drawings Figure 1 is a side elevation of a loom provided with the shipper mechanism shown in connection with a cooperating brake mechanism and mounted upon the right hand side of the loom; Fig. 2 is an elevation of the shipper lever in the knock-off position; Fig. 3 is a detail showing the position of the shipper lever for releasing the brake with the clutch mechanism out of engagement; Fig. 4 is a detail view showing the shipper lever in normal operative position; Fig. 5 is a plan view of a portion of the loom showing the shipper lever, brake mechanism and means for operating the clutch mechanism; Fig. 6 is a detail view in plan showing the gearing for the clutch actuating mechanism; Fig. 7 is an elevation of the apparatus shown in Fig. 6; Fig. 8 is a section of the clutch mechanism taken on a line through the clutch disk and driving pulley; Fig. 9 is a plan view of the clutch mechanism; Fig. 10 is a section on line 10—10 of Fig. 11; and Fig. 11 is a left hand side elevation of the clutch mechanism and cooperating gearing Upon the knocking off of the loom due to any one of several possible causes, the driving mechanism is first disengaged and the brake mechanism is thereafter actuated to effect an immediate stopping of the loom. Before starting the loom again it is often desirable to turn the loom over by hand and to this end the brake must be released, at the same time allowing the clutch mechanism to remain inoperative. According to the present invention, the shipper lever has three operative positions, a knock-off position, a brake-release position and a normal or running position. After knocking off of the loom, the loom may be placed in condition for turning over by hand by first moving the shipper lever to the intermediate position, thus releasing the brake. The loom is then caused to assume normal operation by moving the shipper lever into the running position.

The illustrated embodiment of the invention includes a shipper lever 12 and an actuator lever 14 which has provision for being placed in three distinct positions by the motion of the shipper lever. To this end, the shipper lever 12 is provided with a rocking member or dog 13 pivoted upon the shipper lever at 16 and provided with a roller 18. In order to prevent lateral motion between the shipper lever 12 and the actuator lever 14, the dog is provided with a guard finger 19 disposed at the opposite side of the actuator lever from the shipper lever, as indicated in Fig. 1. The actuator lever 14 is provided with notches 20 and 22 to engage the roller 18. The motion of the dog with respect to the shipper lever is limited by a guard 24 adjustably secured to the shipper lever by a bolt passing through a slot 26 in the shipper lever. The actuator lever 14 is provided with a hub 15 pivoted at the outer end of a bracket 28, the hub 15 also serving as a stop against the rearward motion of the shipper lever, as indicated in Fig. 5. When the shipper lever and actuator lever are in the relative positions indicated in Fig. 2, the loom is knocked off, the clutch being then shipped and the brake applied in a manner to be presently described. In this position the lever 14 does not come in contact with the roller 18 but is slightly spaced therefrom as clearly indicated in the figure.

Upon moving the shipper lever forward slightly, the roller 18 seats in notch 20 and the actuator lever 14 is raised by the action of the dog to release the brake mechanism, the levers being locked by the dog in the position indicated in Fig. 3. By moving the shipper lever 12 still farther forward, the roller 18 engages notch 22 of the actuator lever, lifting the latter into the position shown in Fig. 4, thereby applying the power to the loom, the dog in this case also serving as a lock which may be upset by an outward blow.

The connections between the actuator lever and the clutch and brake mechanisms include a link 30 mounted upon the actuator lever 14 and connected to a bell crank lever 32 pivoted at 34 upon a bracket 36 secured to the frame of the loom. The bell crank lever is provided at its outer end with a weight 38 for the purpose of insuring immediate application of the brake when the loom is knocked off. The brake band 40 which encircles drum 42 secured to the crank shaft of the loom has one end fixed at 44, the other end being connected by a link 46 with one arm of the bell crank lever 32, as indicated particularly in Fig. 1. The raising of the actuator lever 14 into the position indicated in Fig. 3 by the action of the rocking member 13 is sufficient to release the brake band 40 through the motion of the bell crank lever. Continued motion of the shipper lever seats the roller 18 of the rocking member in the notch 22 of the actuator, and lifting the actuator still further operates to actuate the clutch mechanism to set the loom in motion, thereby putting it in running condition.

The upper end of the bell crank lever 32 is connected to the devices which operate the clutch mechanism. The link 48 secured to the upper end of the bell crank lever 32 is adjustably connected to the draw bar 50. This draw bar is directly connected to a lever 52 by which the clutch slide is actuated. This lever 52 is pivoted at 54 on a pin rising from the sleeve 56 which is mounted to slide on the stud 58 which is secured to the frame of the loom. The lever 52 is provided with a toothed cam portion 60 which engages the correspondingly shaped toothed cam 62 pivoted at 64 on a pin rising from the bracket 66 secured to the frame of the loom. When the lever 52 is pulled upon by the draw bar 50 to turn it on its pivot 54, the two toothed cam portions articulate with each other and operate to force the pivot 54 outwardly and thereby to move the slide 56 to the right, as viewed in Figure 7. This movement of the slide 56 operates to exert a pull on the clutch slide rod 68 which actuates the clutch in the manner hereinafter described. Depending from the slide 56 is an arm 70 provided with two ears which embrace opposite sides of a collar 72 secured to the clutch slide rod 68. The end of the draw bar 50 is slotted at 74 and receives in the slot the pin 76 which is secured in the lever 60. This slot provides lost motion between the bell crank lever 32 and the slide rod 68. Thus, with the parts in knock-off position, as shown in Fig. 6, the draw bar 50 and the bell crank lever 32 may be moved to apply or release the brake without transmitting movement to the clutch mechanism. The lever 52 is further provided with an integral portion 78 which is slotted at 80, and within that slot receives the pivot 64 of the toothed cam 62. The slot 80 is curved at such an angle that as the lever 52 is rocked and the toothed cams move the pivots 54 and 64 apart, the portion 78 moves so that it may move over the pivot 64 and still contribute to the support of the lever 52. The clutch operating slide rod 68 is further supported by the depending arm 82 of the bracket 66 through a hole in which it slides. This holds the sleeve 56 from rocking on the stud 58.

The clutch mechanism is located on the opposite side of the loom from the shipper lever and brake and is operated by means of the clutch operating slide rod 68. The loom is provided here with a jack shaft 86, mounted in bearings in the loom frame and carrying a loose pulley 88 provided on one side with a friction face adapted to be clutched to the clutch disk 90. A friction material such as leather or cork 92 is provided to be interposed between the pulley and the clutch disk. The clutch disk and the gear 94 mounted alongside of it are both splined to the jack shaft 86. The loose pulley is constantly driven by a belt by which power is applied to the loom. When it is pressed against the clutch disk 90 power is transmitted to the loom through the gear 94 to the gear 96 mounted on the cam shaft 98 and thence to the gear 100 on the crank shaft 102. The jack shaft is provided with the hand wheel 104 by which the loom may be turned over by hand when desired. The hub of the loose pulley 88 is provided with a flange 106, and alongside of it is mounted the clutch operating disk 108 between which and the flange 106 of the loose pulley is mounted a fibre washer 110. By moving the clutch disk to the left, as viewed in Fig. 8, the loose pulley is forced into contact with the clutch disk and the power is applied. By pulling the loose pulley away from the clutch disk the clutch disk is freed from the loose pulley, and the latter is no longer driven thereby. The clutch operating disk 108 is provided at the top and bottom with pins 112 and 114 which are engaged by the clutch operating lever 116, the latter being provided in its upper side with a slot 118 to receive the pin 112, a similar slot being provided in the lower portion of the lever to receive the pin 114. This clutch operating lever is provided with a hub to which is secured the pivot pin 120 which is received in a bracket 122 secured to the frame of the loom. The clutch operating lever is also provided with a declutching member 126 which is bolted on it and provided with an arm which extends downward from the upper portion of the clutch lever and is adapted to engage the left hand surface of the flange 106 on the loose pulley 88. When the clutch lever is moved to the left, as viewed in Fig. 9, it closes the clutch and the loom is driven. When it is moved to the right, the clutch is opened and the loom is in brake-release or knock-off position. This clutch operating lever 116 has a long arm which extends forward from the jack shaft, and is provided at its end with a slot 130 adapted to receive the pin 132 which projects upwardly from a slide 134 consisting of a body portion 136 provided with two ears 138 and 140 which are mounted to slide on the bar 142. To this slide 134 is connected the clutch operating slide bar 68, as shown in Fig. 10, the ear 138 being provided with a depending projection which receives the right-angularly bent end of the clutch operating slide rod 68. The slide 134 is normally held in right hand position, as viewed in Fig. 9, by means of the spring 144 which is mounted on the bar 142, and takes against the collar 146 secured to the bar 142, its other end taking against the ear 140 of the slide 134. When the clutch operating slide rod 68 is moved to the left, as shown in Fig. 9 (which is a movement to the left, as viewed in Fig. 5, and to the right as viewed in Fig. 7), the clutch operating lever 116 is moved to cause the clutch to be closed. When the pull on the rod 68 is released, the spring 144 pushes the clutch operating lever 116 in the opposite direction and releases the clutch.

It will be seen that by this construction the brake mechanism may be readily released to allow turning over of the loom by hand without engaging the clutch mechanism. This is accomplished by moving the shipper lever slightly to raise the actuator lever 14 through the action of the dog 13. Further motion of the shipper lever lifts the actuator lever 14 into normal operating position. By this construction the shipping of the clutch before the application of the brake is always insured. Another advantage of the improved shipper mechanism lies in the fact that the loom may be easily knocked off by a slight blow in an outward direction on the shipper lever. When the lever is in either of the positions indicated in Figs. 3 and 4, the mechanism may be moved to knock-off position merely by striking or pulling the shipper lever outwardly, thus disengaging the dog from the actuator lever. Accordingly, a wide variety of mechanisms may be employed for the purpose of knocking off the loom which may be made to act more delicately and at the same time more positively than if used in connection with the previously known types of shipper mechanisms which employed ordinarily a shipper lever engaging some kind of a notched bracket attached to the loom frame.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. A loom having, in combination, a clutch mechanism, a brake mechanism, a shipper lever, connections between the shipper lever and the brake and clutch mechanisms whereby the loom is changed from knock-off position to brake-release position and then to normal running position on motion of the shipper lever, and means including a rocking member for locking the shipper lever in either of the last two positions.

2. A loom having, in combination, a clutch mechanism, a brake mechanism, a shipper lever, an actuator lever having a knock-off position, a brake-release position, and a normal running position, connections between the actuator lever and the clutch and brake mechanisms, and a rocking member connected with the shipper lever for moving the actuator lever and adapted to lock the levers in either of the last two positions.

3. A loom having, in combination, a clutch mechanism, a brake mechanism, an actuator lever, connections between the actuator lever and the brake and clutch mechanisms, means for moving the actuator lever from knock-off position to brake-release position whereby the loom may be turned over by hand, said means including a rocking member adapted to lock the actuator lever in brake-release position.

4. A loom having, in combination, a clutch, a brake mechanism, a shipper lever, connections between the shipper lever and the clutch and brake mechanisms to successively actuate the brake mechanism and the clutch mechanism upon moving the shipper lever from knock-off position, said connections including a dog for locking the shipper lever in brake-release position and normal running position.

5. A loom having, in combination, a brake mechanism, a clutch mechanism, a shipper lever, means for releasing the brake mechanism upon slight forward motion of the shipper lever in a manner not to affect the clutch mechanism, means for engaging the clutch mechanism upon further movement of the shipper lever, and means including a rocking member for locking the shipper lever in either position.

6. A loom having, in combination, a clutch mechanism, a brake mechanism, a shipper lever, connections including a rocking member between the shipper lever and the brake and clutch mechanisms whereby the brake mechanism is first released and the clutch mechanism is then engaged upon moving the shipper lever from knock-off position, said rocking member having provision for locking the shipper lever in either position, and means for insuring quick disengagement of the clutch and application of the brake upon upsetting of the rocking member.

7. A loom having, in combination, a clutch mechanism, a brake mechanism, a shipper lever, connections between the shipper lever and the brake and clutch mechanisms whereby the loom may be changed from knock-off to brake-release condition and thence to normal running condition on movement of the shipper lever, said connections including means for locking the shipper lever in the latter position.

8. A loom having, in combination, a clutch mechanism, a brake mechanism, a shipper lever, an actuator lever connected with the clutch and brake mechanisms whereby the brake and clutch mechanisms may be successively actuated on movement of the actuator lever from knock-off position, connections between the shipper lever and actuator lever for moving the actuator lever, said connections having provision for locking the lever in the latter positions.

9. A loom having, in combination, a clutch mechanism, a brake mechanism, a shipper lever, means for releasing the brake mechanism after knocking off of the loom upon slight motion of the shipper lever without actuating the clutch mechanism, and means for actuating the clutch mechanism upon the continued motion of the shipper lever.

JONAS NORTHROP.